United States Patent [19]

Beeson et al.

[11] 4,040,098
[45] Aug. 2, 1977

[54] EDITING SYSTEM FOR CONTROLLING THE TRANSFER OF SELECTED VIDEO INFORMATION FROM A VIDEO SOURCE TO A VIDEO TAPE RECORDER

[75] Inventors: Gary H. Beeson; William D. Skinner, both of Newport Beach, Calif.

[73] Assignee: Convergence Corporation, Irvine, Calif.

[21] Appl. No.: 666,784

[22] Filed: Mar. 15, 1976

[51] Int. Cl.² .............................................. H04N 5/785
[52] U.S. Cl. ...................................... 360/14; 358/127; 360/10
[58] Field of Search ................... 360/13, 14, 10, 9, 84, 360/74; 358/128

[56] References Cited

U.S. PATENT DOCUMENTS

| | | | |
|---|---|---|---|
| 3,095,473 | 6/1963 | Roizen | 360/14 |
| 3,427,398 | 2/1969 | Hemmerling et al. | 360/14 |
| 3,646,260 | 2/1972 | Bolger | 360/14 |
| 3,787,617 | 1/1974 | Fiori | 360/14 |
| 3,869,209 | 3/1975 | Yamagishi et al. | 360/14 |

OTHER PUBLICATIONS

O'Donnell et al., Modifications to Videotape Recording Equipment to Provide an Improved Method of Editing ½ inch Recordings, J. of S.M.P.T.E., vol. 82, 7/73, pp. 554–557.

Performance Specifications DV-200 Video Tape Recorder, 11/63.

Shimada, et al., Automated Video Tape Editing System, Toshiba Review, No. 16, Oct. 71, pp. 5–10.

*Primary Examiner*—Raymond F. Cardillo, Jr.
*Attorney, Agent, or Firm*—Keith D. Beecher

[57] ABSTRACT

An editing control system is provided for on-line or off-line editing of a cassette or open-reel helical scan type video tape recorder, or the like. Tape-to-tape editing may be carried out by transferring selected video information from a "playback" video tape recorder to a "record" video tape recorder, whereas camera-to-tape editing may be carried out by transferring selected video information directly from a video camera to the record video tape recorder. The system to be described includes a solid state electronic control for the playback and record video tape recorders, with manually operated joysticks which permit forward and reverse motion of the tapes in the recorders for the precise selection of the edit frames. A feature of the system is that the video information passes directly to the record video tape recorder, and not through the control system itself, so that there is no need to provide complex wideband signal channels through the control system. Also, a single monitor is automatically controlled to monitor both the record and playback video tape recorders during the operation of the control system.

12 Claims, 11 Drawing Figures

MOTOR DRIVE AMPLIFIER -173-

EDITING SYSTEM FOR CONTROLLING THE TRANSFER OF SELECTED VIDEO INFORMATION FROM A VIDEO SOURCE TO A VIDEO TAPE RECORDER

BACKGROUND OF THE INVENTION

The video tape editing control system of the invention fulfills a growing need in the television industry for a practical means which permits accurate and rapid editing of video tapes, so that a finished edited master tape may be assembled from the video information on one or more original tapes, or directly from a video camera. The system of the invention fulfills the aforesaid need in that it provides a rugged, low cost and accurate unit which is capable of interfacing to both the cassette and open-reel types of helical scan video tape recorders for precise tape-to-tape or camera-to-tape editing.

It is conventional practice to provide video tapes with a control track in which pulses are recorded at a preselected rate for control purposes. The editing control system of the invention, in the embodiment to be described, utilizes the pulses from the video tape control track precisely to control the operation of both the playback video tape recorder and the record video tape recorder around the selected edit frame, thereby obviating the need for complicated time codes on the tapes themselves, and for ancillary complex control equipment.

The editing control system of the invention, in the embodiment to be described, includes two manually operated joysticks which serve to control the forward and reverse movement of the video tape in the playback and record video tape recorders in the vicinity of the edit frames so as to permit exact edit frames on the tapes to be selected. The joysticks provide extremely tight control of tape speed in either direction from still frame up to, for example, three times normal tape speed.

The editing system of the invention, as will be described, uses a single cathode-ray tube monitor, which monitors both the playback and record video tape recorders, and which may be controlled to provide a repeatable preview of the individual edit frames before an actual "edit" or transfer of information to the record video tape recorder is made. Moreover, digital interlock logic is provided for foolproof operation.

Although the particular editing control system to be described herein is constructed to be interfaced, for example, with a Sony VO2850 helical scan video tape recorder, it will become evident as the description proceeds that the editing control system of the invention may be adapted to interface with a wide range of both cassette-type and open-reel type video tape recorders.

As stated above, the video tape editing control system of the invention may be used in both on-line and off-line tape-to-tape editing. On-line editing commonly denotes that edit decisions are made on the same record video tape recorder in which the finished edited tape is assembled, and there is no need to tabulate edit decisions by frame numbers of the video tape. Off-line editing generally denotes that edit decisions are performed on lower cost video tape recorders than the one used to assemble the finished edited master tape. In the latter case, the frame numbers of the video tape corresponding to each edit frame must be recorded, and these frame numbers are subsequently used when the edited master tape is assembled.

In the editing control system of the invention, as mentioned above, the video signal are fed directly from the playback video tape recorder to the record video tape recorder. It is, therefore, possible to use time base correctors, processing amplifiers, drop-out compensators, or the like, without affecting in any way the operation of the editing control system. Also, since the editing control system of the invention does not process any of the video signals themselves, the quality of the video signals is unaffected by the control system.

DETAILED DESCRIPTION OF THE ILLUSTRATED EMBODIMENT

Figure 1:
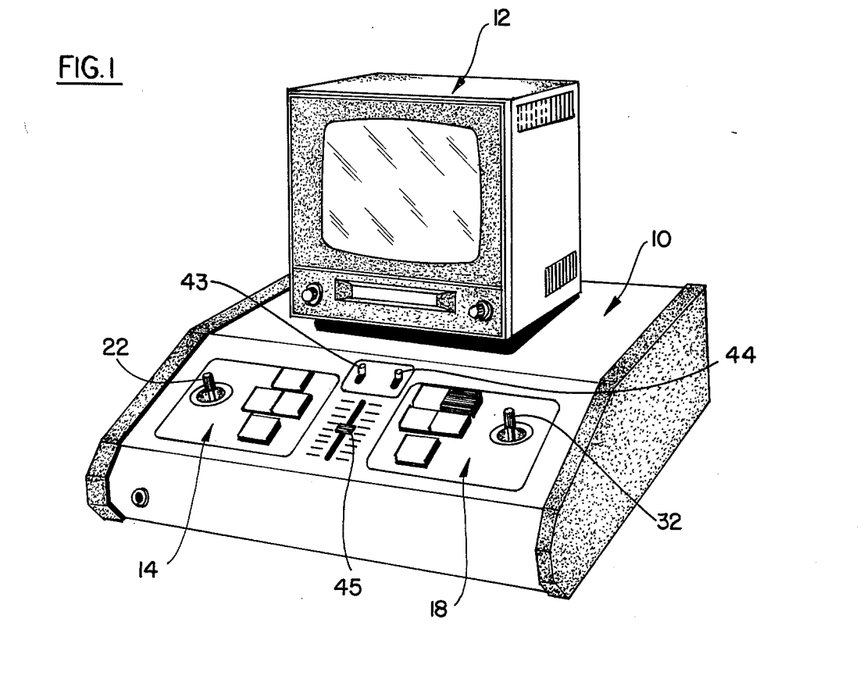
FIG. 1 is a perspective representation of a video tape editing unit which may be constructed to incorporate the editing control system of the invention, in accordance with one of its embodiments.

The unit of FIG. 1 includes base 10 which supports a cathode-ray monitor 12 of any appropriate construction. For example, a 9-inch Conrac Video Monitor may be used. The unit 10 includes a first control panel 14 which controls the operation of a playback video tape recorder, such as designated 16 in FIG. 3, and it also includes a second control panel 18 which controls the operation of a record video tape recorder, such as designated 20 in FIG. 3.

Figure 2:
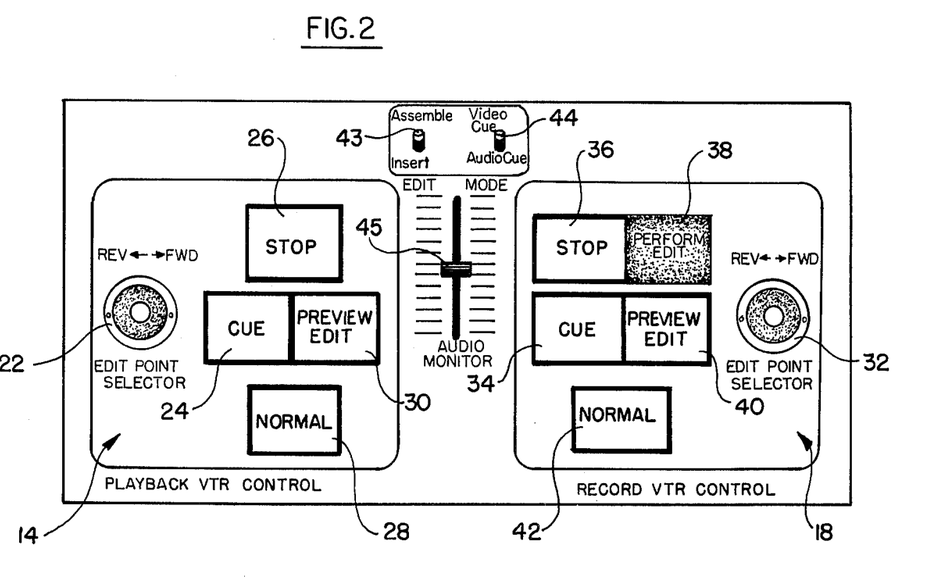
FIG. 2 is a top plan view, on a somewhat enlarged scale, of the control panel of the unit of FIG. 1.

As best shown in FIG. 2, the control panel 14 includes a joystick potentiometer control 22, and a series of pushbutton switches designated 24, 26, 28 and 30. The joystick control 22 may be moved to the left or right from a central position to cause the tape in the playback video tape recorder 16 (FIG. 3) to move in the forward or reverse direction from a still-frame position, and at a speed dependent upon the angular displacement of the joystick from its central position. The pushbutton switches 24, 26, 28 and 30 may be of the type which are illuminated when actuated, and they are inscribed respectively as "Cue", "Stop", "Normal" and "Preview Edit".

Figure 3:
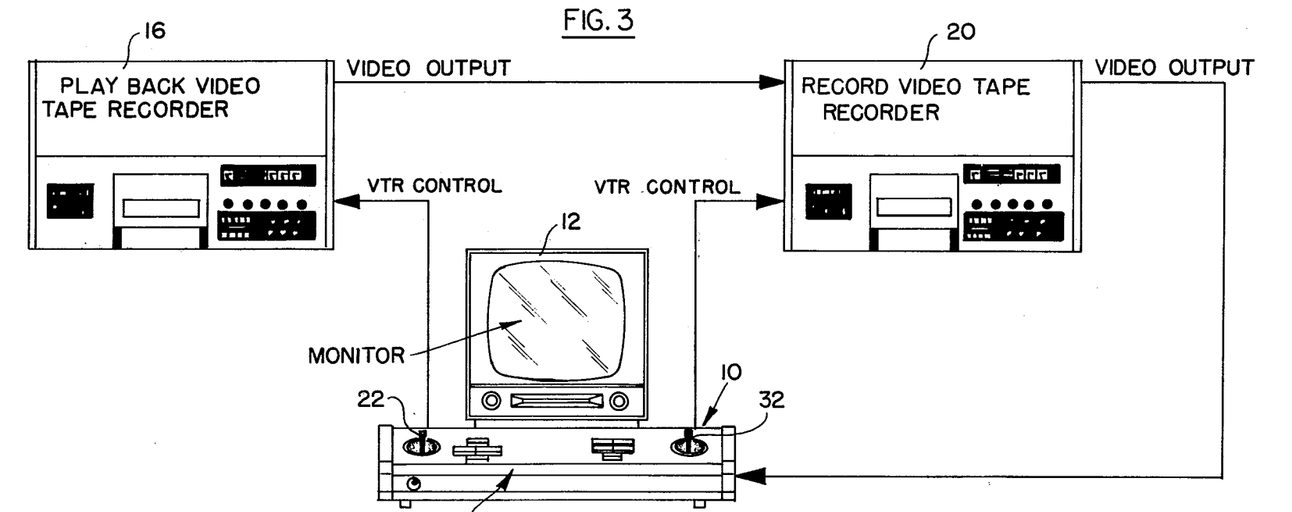
FIG. 3 is a diagrammatic representation of the manner in which tape-to-tape editing may be carried out by the editing control system of the invention.
Figure 4:
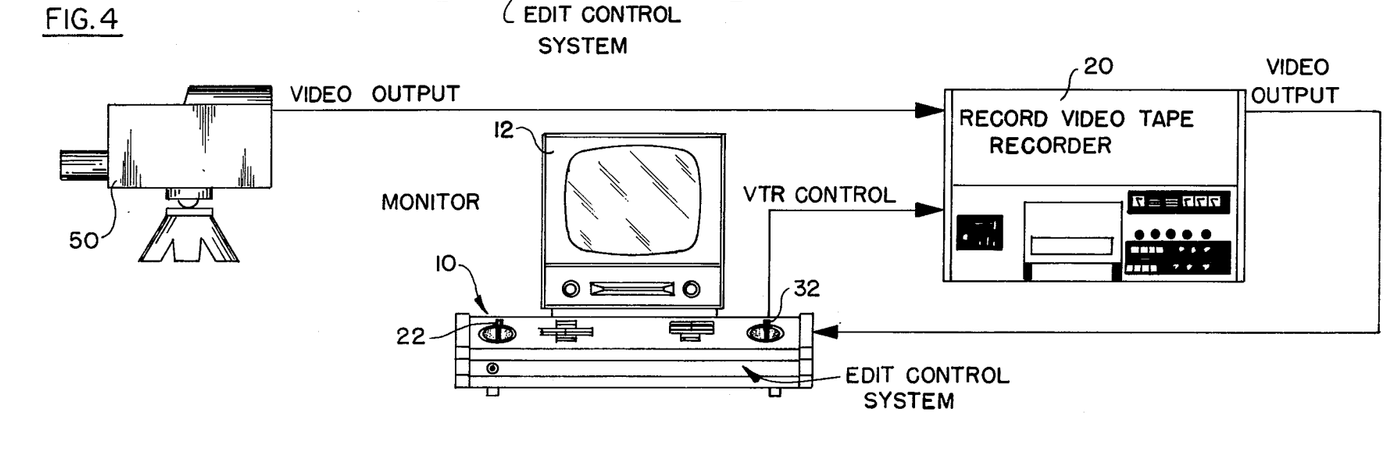
FIG. 4 is a diagrammatic representation of the manner in which camera-to-tape editing may be carried out by the editing control system of the invention.

The control panel 18 includes a joystick control 32 which is similar to the joystick control 22, and which controls the speed and direction of the tape in the record video tape recorder 20 of FIGS. 3 and 4. The control panel 18 includes a series of pushbuttom switches 34, 36, 38, 40 and 42 which, like the pushbutton switches of control panel 14, may be of the illuminated type, and which ae inscribed respectively as "Cue", "Stop", "Perform Edit", "Preview Edit" and "Normal". The pushbutton switches 34 and 24, 36 and 26, 40 and 30, 42 and 28, are electrically interlocked, so that either one of the switches of the individual pairs may be actuated to perform the desired operation.

When the playback joystick 22 is in its central position, the monitor 12 is caused to monitor the record video tape recorder 20 (FIGS. 3 and 4). However, when the playback joystick 22 is moved from its central position, the monitor is automatically caused to monitor the playback video tape recorder 16 (FIG. 3). This control of the monitor 12 is through an "E-to-E" switch which is conventionally included in the record video tape recorder, and which may be controlled to introduce the video output from the playback video tape recorder and the video output from the record video tape recorder selectively to the monitor 12. In this way, a single monitor may be used, and the monitor is automatically controlled to look at the appropriate recorder at the appropriate times.

The front panel also includes an "assemble-insert" switch 43 which selects either an "insert" or "assemble" mode in the system. When the switch is set to "insert" a programmable end insert timer is activated to permit inserts of predetermined durations to be made. A "video cue/audio cue" switch 44 in also provided to permit the operator to make a choice as to whether or not the video edit point should be compensated for an audio delay when editing to tight audio cues. A volume control 45 is provided to control the audio monitor volume during preview.

In the representation of FIG. 3, the editing control unit 10 is used to control the transfer of video information from the playback video tape recorder 16 to the record video tape recorder 20. In the represenation of FIG. 4, the editing control unit 10 is used to control the transfer of video information directly from a video camera 50 to the record video tape recorder.

To operate the editing control system of the invention for video tape-to-tape recording, as represented diagrammatically in FIG. 3, the playback video tape recorder 16 is activated, and either one of te interlocked "Normal" pushbutton switch 28 or 42 (FIG. 2) is depressed. This causes the playback video tape recorder and the record video tape recorder both to move forward at normal speed, while the video information on the record video tape recorder is being monitored by the monitor 12.

The "Normal" mode continues until the general location on the playback video tape is reached at which its information is to be transferred to the record video tape recorder. Then, one or the other of the interlocked "Stop" pushbutton switches 26 or 36 is depressed to set the system to its joystick control mode. This action causes the tapes in both the recorders to stop, and also causes the circuits of the joysticks 22 and 32 to be activated. The tapes in the playback video tape recorder 16 and in the record video tape recorder 20 may now be individually controlled by the joysticks. During this mode of operation, the monitor 12 monitors the playback video tape recorder so long as the playback joystick 22 is operated. However, whenever, the joystick 22 is in its central position, and the record joystick 32 is being operated, the monitor is automatically switched to monitor the record video tape recorder.

During the joystick control mode, the "Cue" pushbutton switches 24 and 34 flash to indicate that these switches are to be operated next. When eithr of the interlocked "Cue" pushbutton switches 24 or 34 is depressed, both the playback video tape recorder and the record video tape recorder simultaneously are driven in the reverse direction through a predetermined number of frames, for example 300, to a cue position, at which both tapes stop. The "Preview Edit" pushbuttom switches 30, 40 now flash, indicating that they are to be operated next, and when one or the other of these interlocked switches is depressed, both the playback and record video tape recorders simultaneously move forward through the selected edit frame, and through a predetermined number of frames, for example 200, beyond the edit frame. Then, the two video tape recorders are automatically reversed, and are returned through the edit frame back to their original cue positions. The two video tape recorders are then automatically stopped in their original cue positions.

The operation described in the previous paragraph permits a "preview" to be made of the video information on the playback video tape recorder 16 in the vincinity of the edit frame, so that the playback video tape may be looked at before the actual transfer to the record video tape is effectuated. At the end of each complete preview cycle, the operator may change the edit frame in either direction by operating the joysticks 22 and 32, and the preview cycle may be repeated by actuating one or the other of the "Preview Edit" pushbutton switches 30 or 40. However, if after a complete preview cycle, the edit is acceptable, the operator then presses the "Perform Edit" pushbutton switch 38, and one or the other of the "Preview Edit" pushbutton switches 30 or 40, and the information from the playback video tape recorder will be transferred to the record video tape recorder automatically, starting precisely at the selected edit frame.

Figure 5A:
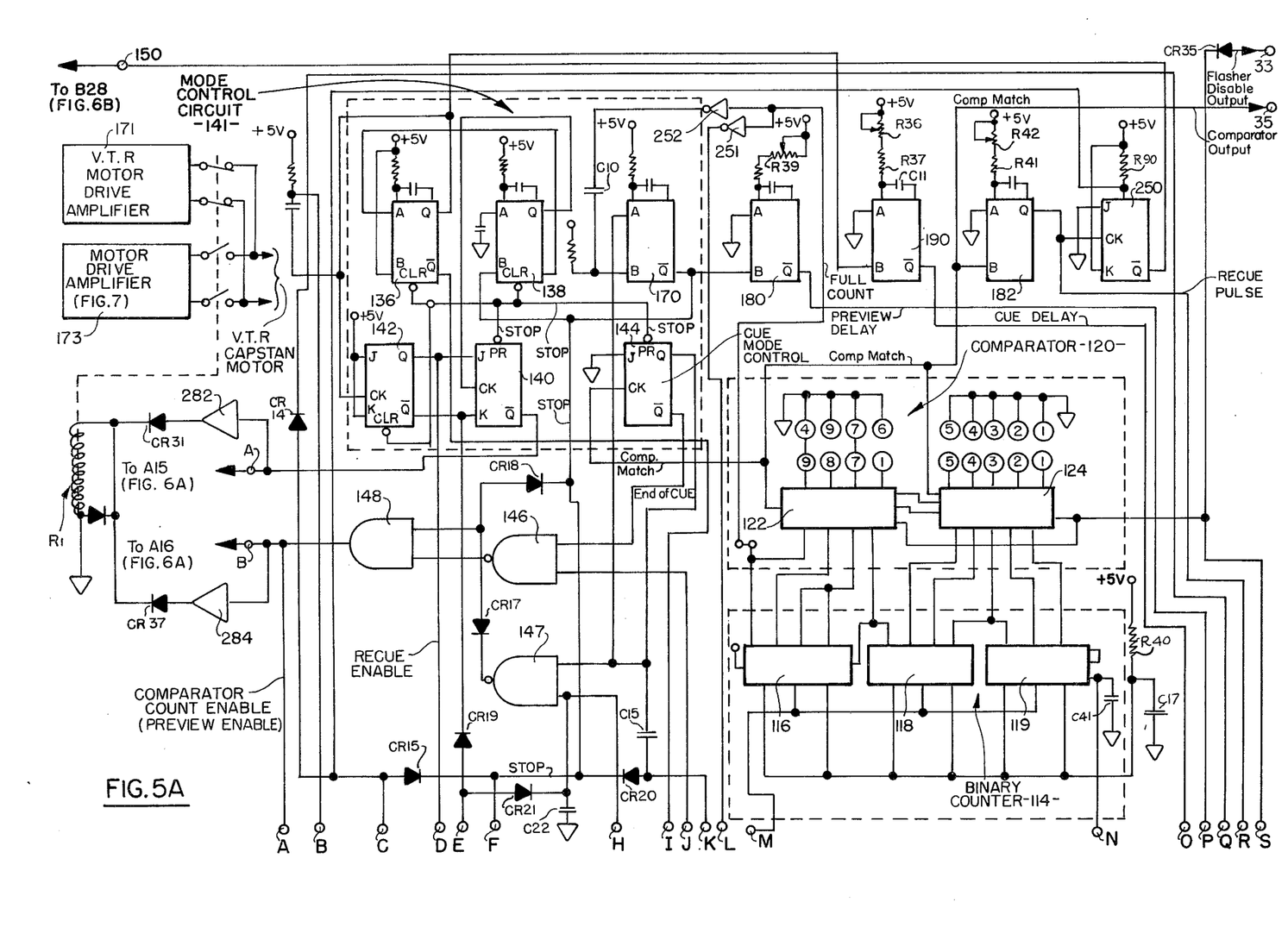
FIGS. 5A and 5B together constitute a schematic diagram of an editing control circuit which may be incorporated into the unit of FIG. 1.
Figure 5B:
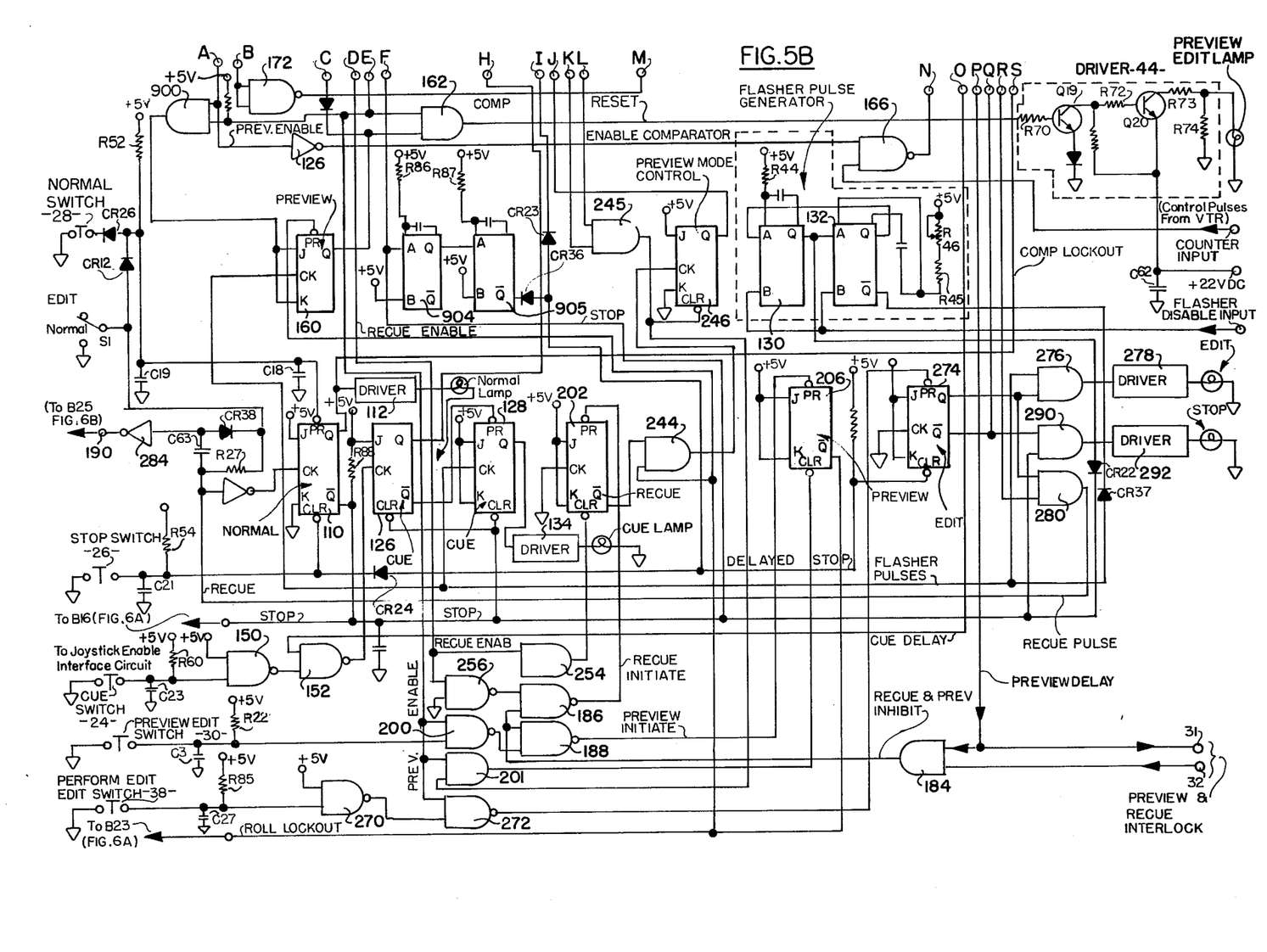

The aforesaid operations are implemented by means of the control circuit shown in FIGS. 5A and 5B. The control circuit includes a flip-flop 110, designated the "Normal" flip-flop. The "Normal" switch 28 is connected to the preset terminal of the flip-flop 110 through a diode CR26. The preset terminal of flip-flop 110 is also connected through a 1kilo-ohm resistor R52 to the positive terminal of a 5-volt direct current source, and to a 0.01 microfarad grounded capacitor C19. The preset terminal of flip-flop 110 is also connected to a 0.100 microfarad grounded capacitor C18 which assures that the flip-flop 110 will be actuated to its set condition when the system is first turned on. The cue output terminal of flip-flop 110 is connected through an appropriate driver stage 112 to the indicator lamp in the "Normal" pushbutton switch 28, so that when the system is operating in its normal condition, the lamp will be energized.

The circuitry of the driver stage 112, and of subsequent lamp driver stages to be identified, may be similar to the circuit shown in conjunction with the indicator lamp in the "Preview Edit" switch 30, the latter circuit being designated 44. The circuit 44 may comprise an NPN transistor Q19 and a PNP transistor Q20. The input terminal of the driver circuit 114 is connected through a 3300 ohm resistor R70 to the base of transistor Q19, whose emitter is connected through a diode C32 to ground. The collector of transistor Q19 is connected to the base of transistor Q20 through a 120 ohm resistor R72, and to the emitter of transistor Q20 through a 10 kilo-ohm resistor R71. The emitter of transistor Q20 and resistor R71 are both connected to the positive terminal of a 22-volt direct current source, and to a grounded 0.01 microfarad capacitor C62. The collector of transistor Q20 is connected through a 68 ohm resistor R73 to the lamp in the "Preview Edit" switch 30, the lamp being shunted by a 10 kilo-ohm resistor R74.

The control circuit also includes a binary counter 114 (FIG. 5A) which is made up of integrated circuits 116, 118 and 119. The binary counter 114 is connected to a comparator 120 (FIG. 5A) which is made up of integrated circuits 122 and 124. The comparator 120 integrated circuit 122 is strapped across selected pins, as indicated, to provide an output on the lead designated "comp match" when the counter reaches a count corresponding, for example, to 300 frames of the video tape recorder controlled by the control circuit. The Q output terminal of the normal flip-flop 110 is connected to the comparator 120 by a lead designated "comp lockout" to render the comparator inactive so long as the system is operating in its normal mode.

The comparator integrated circuit 124 has pins 1-5, and when switch 44 of FIG. 1 is set to "audio cue", selected ones of the pins are strapped to cause the actual video edit point to correspond with the audio edit point. When an audio edit is made, the actual edit point is muted anywhere from 4 to 15 frames, or 180 to 500 milliseconds to blank the audio switch "pop" which is inherent in the video tape recorder. This muting effect creates the equivalent of a delay in the audio recording as related to the video recording. Switch 44 permits the operator to make a choice as to whether he wants the video edit point, or the audio edit point to be precise.

When the audio edit point is to be precise, switch 44 is set to "audio cue", causing certain pins of the comparator integrated circuit 124 to be strapped, which effectively subtracts digital bits from the comparator 120. These bits are binary coded, pin 1 being the least significant. Each bit represents one control track pulse from the video tape recorder, which is equivalent to 1 field or ½ a video frame; or it can be related as 16.6 millisecends of audio delay.

It will be understood that two control circuits, such as the control circuit of FIGS. 5A and 5B, are provided in the editing control system of the invention, one for the playback video tape recorder 16 (FIG. 3) which is under the control of the controls of panel 14 (FIG. 2), and one for the record video tape recorder 20 (FIG. 3) which is under the control of the controls of panel 18.

As described aboe, the playback and record video tape recorders 16 and 20 are originally set in their normal mode, and the video tapes in both recorders move forwardly at normal speed until they reach the vicinity of the frame at which the edit is to be made. Then, the "Stop" pushbutton swtich 26 is actuated to transfer the control of the video tape recorders to the joysticks 22 and 32 of FIGS. 1 and 2.

The "Stop" switch 26 in the circuit of FIG. 5B is connected to the junction of a 0.01 microfarad grounded capacitor C21 and a 1 kilo-ohm resistor R54, the resistor being connected to the positive terminal of the 5-volt direct current source. The "Stop" switch 26 is also connected to the clear terminal of the normal flip-flop 110 so that the normal flip-flop 110 is reset during the stop mode. The resetting of flip-flop 110 removes the lockout control from comparator 120, so that the comparator becomes active.

The $\overline{Q}$ output terminal of the normal flip-flop 110 is connected to the clear input terminals of a pair of flip-flops 126 and 128, which are designated the "cue" flip-flops. The $\overline{Q}$ output terminal of the normal flip-flop 110 is also connected through a 4.7 kilo-ohm resistor R88 to the positive terminal of the 5-volt direct current source. Therefore, when the normal flip-flop 110 is reset during the stop mode, the cue flip-flops 126, 128 are released and may be triggered to either their set or reset states.

The control circuit of FIG. 5B also includes a pair of one-shots 130, 132 which are interconnected as an astable multivibrator to form a flasher pulse generator 133, and which generates flasher pulses at the $\overline{Q}$ terminal of the flip-flop 132. These flasher pulses are introduced through a diode CR37 to the clock input terminal CK of cue flip-flop 128, so that the flip-flop may be triggered by the resulting flasher pulses continuously between its reset and set states.

The Q output terminal 11 of the cue flip-flop 128 is connected through a driver circuit 134 to the lamp associated with the cue switch 24, so that during the stop mode, the cue lamp flashes to indicate that the next operation will involve the actuation of the cue switch.

The $\overline{Q}$ output terminal of the normal flip-flop 110 is also connected to the clear input terminal of a pair of flip-flops 136, 138 in a mode control circuit 141 (FIG. 5A), and to the preset input terminal of a flip-flop 140 in the mode control circuit, as well as to the clear input terminal of a flip-flop 142, and to the preset input terminal of a cue mode control flip-flop 144 in the mode control circuit.

The $\overline{Q}$ output terminal 14 of the normal flip-flop 110 is also connected to the terminal B16 of the control circuit of FIG. 6, so that during the stop mode the joystick control circuit may be activated, so as to permit the joysticks to be used to move the tapes in the playback and record video tape recorders back and forth about the edit frame.

Figure 6A:
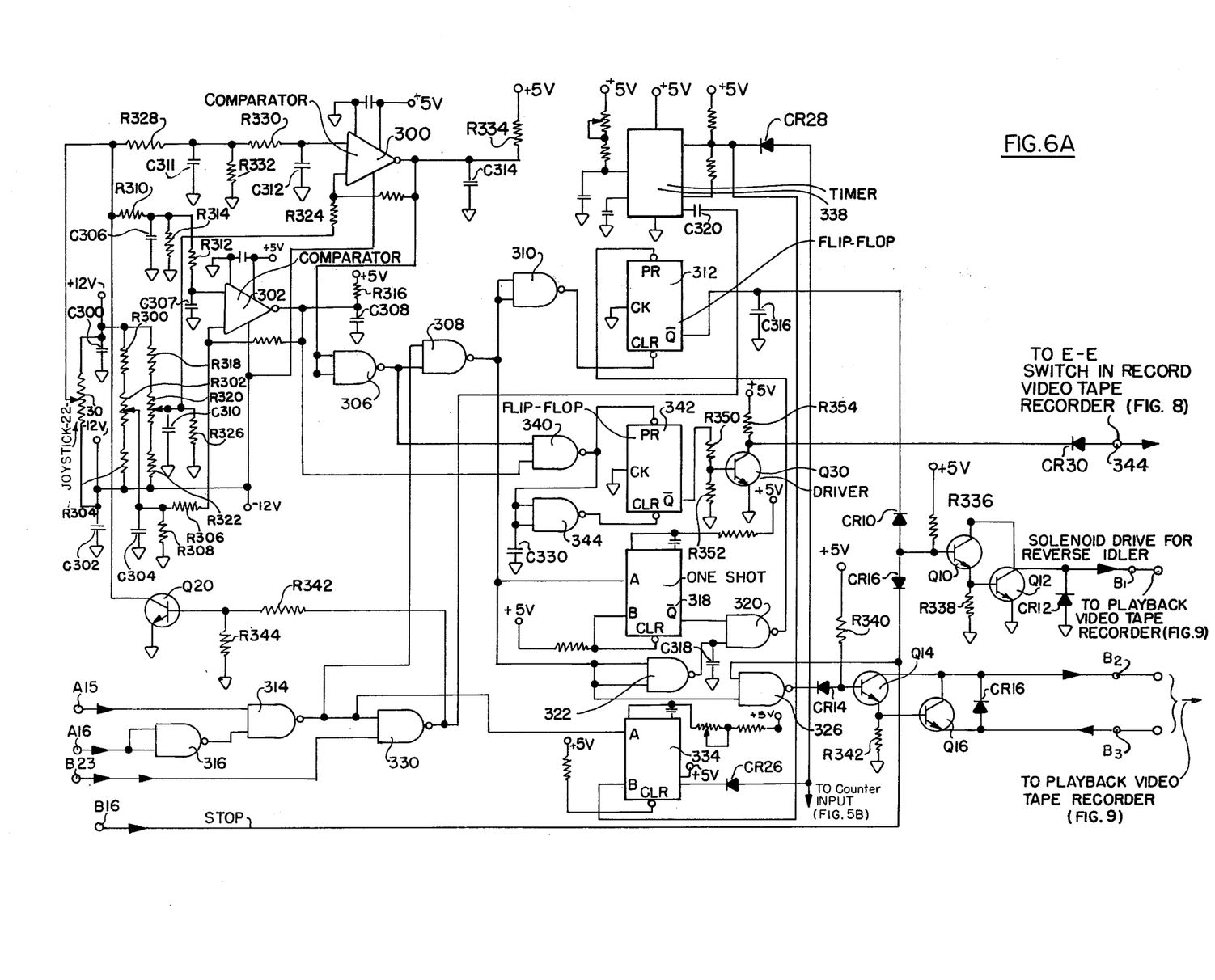
FIGS. 6A and 6B together constitute a schematic diagram of an interface circuit which also may be incorporated into the unit of FIG. 1.
Figure 6B:
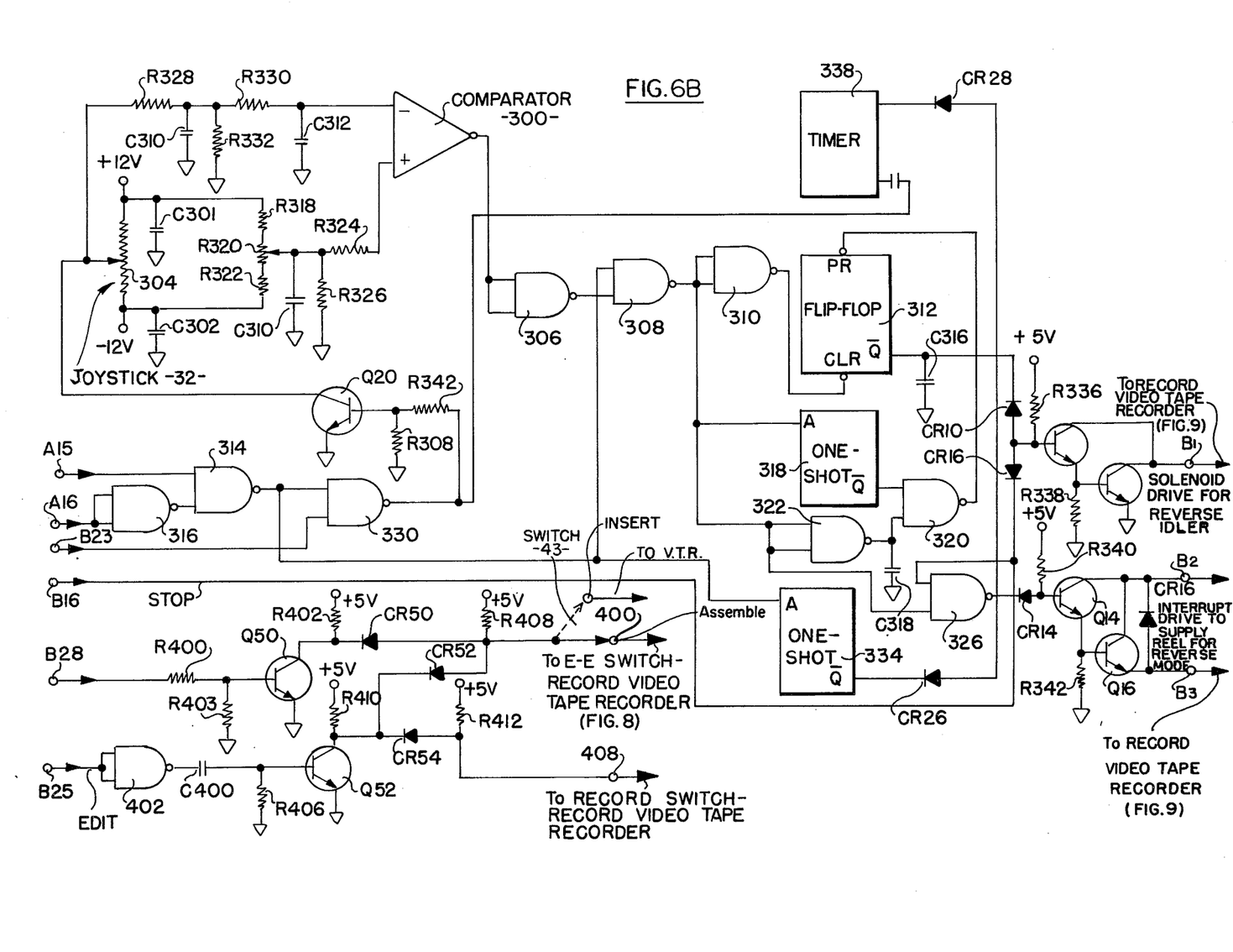

When the control circuit of FIG. 5A and 5B is in the stop mode, during which the joystick control circuit of FIG. 6A and 6B is activated, the $\overline{Q}$ output terminal of the normal flip-flop 110 is high, and this causes the flip-flop 140 in the mode control circuit 141 to be reset, so that its $\overline{Q}$ output terminal 10 is low. The cue mode control flip-flop 144 in the mode control circuit 141 is also preset so that its $\overline{Q}$ output terminal is low. The $\overline{Q}$ terminal of flip-flop 140 is connected to an "and" gate 148, and the $\overline{Q}$ output terminal of flip-flop 144 is connected to a "nand" gate 146, so that both these gates are disabled during the stop mode.

After the video tapes in the playback and record video tape recorders 16 and 20 (FIG. 3) have been adjusted by the joysticks 22 and 32 to the selected edit frame, the flashing "Cue" pushbutton switch 24 is then actuated and, as described above, this causes both tapes to move back from the edit frame a predetermined distance, corresponding, for example, to 300 frames, and then stop.

The "Cue" switch 24 in FIG. 5 is connected to the junction of a 1 kilo-ohm resistor R60 and 0.1 microfarad capacitor C23. The capacitor C23 is grounded, and the resistor R60 is connected to the positive terminal of the 5-volt direct current source. The cue switch is also connected to the input terminal of an inverter 150, whose output terminal is connected to the input terminal of a "nand" gate 152. The output terminal of the "nand" gate 152 is connected to the clock terminal of cue flip-flop 126. The $\overline{Q}$ output terminal of flip-flop 126 is connected to the preset terminal of cue flip-flop 128. The J terminals of the cue flip-flops 126 and 128 are both connected to the positive terminal of the 5-volt direct current source, and the clear terminals of the flip-flops 126 and 128 are connected to the $\overline{Q}$ terminal of the normal flip-flop 110, as previously stated.

The Q output terminal of flip-flop 136 in the mode control circuit 141 is connected to the B input terminal of a one-shot 190 to cause the one-shot 190 to be triggered for a time interval established by the setting of potentiometer R36. This causes the $\overline{Q}$ output terminal of one-shot 190 to go low for a predetermined time interval, thereby disabling the "nand" gate 152, so as to prevent the cue operation from being started until a predetermined time has elapsed, to prevent tape jerk.

After the predetermined time delay, the "nand" gate 152 is enabled, and when the cue switch 24 is operated, the "nand" gate applies a pulse to the clock input of the cue flip-flop 126 to set the flip-flop. The setting of flip-flop 126 sets the second cue flip-flop 128 by virtue of the connection from the $\overline{Q}$ terminal of flip-flop 126 to the preset terminal of flip-flop 128. When the flip-flop 128 is held set by flip-flop 126, the flasher pulses applied to its clock input terminal are no longer effective, so that the cue lamp in the cue switch is now continuously energized to indicate that the unit is now in its cue mode.

During the cue mode, the $\overline{Q}$ output terminal of the mode control flip-flop 140 in the mode control circuit 141 (FIG. 5A) is high. This causes the output terminal A (FIG. 5A) to be high, which terminal is connected to input terminal A15 of the circuit of FIG. 6A. Also, the cue output terminal of cue mode control flip-flop 144 is low, so that the output terminal of "nand" gate 146 is high, due to its connection to the last-named cue output terminal. Therefore, the input terminal of "and" gate 148 is high, so that its output terminal is low, causing the output terminal B (FIG. 5A) to be low, the latter output terminal being connected to the input terminal A16 of the control circuit of FIG. 6A. Under these conditions, the video tapes of the video tape recorders 16 and 20 are driven in the reverse direction.

The $\overline{Q}$ output terminal of flip-flop 140 is also connected through a drive 282 and diode CR31 to a mode control relay R1. The gate 148 is also connected to relay R1 through a driver 284 and diode CR37.

The pulses derived from the control track of the video tapes of the video tape recorders are now applied to the binary counter 114 by "nand" gate 166 (FIG. 5B). The "nand" gate 166 is enabled by the output of inverter 126 which receives its input from the output of "and" gate 148.

Therefore, as the video tapes of the video tape recorders proceed in reverse, the binary counter 114 begins to count, and it counts up to a predetermined count until a comparator match is derived at the output terminal of the integrated circuit 122 of comparator 120 (FIG. 5A). As mentioned above, this match corresponds, for example, to 300 frames of the video tapes of the video tape recorders, and indicates when the tapes have reached their cue position.

The output terminal of the integrated circuit 122 is connected to the clock input terminal of the cue mode control flip-flop 144 in the mode control circuit 108, causing the mode control flip-flop 144 to be reset, and thereby enabling the "nand" gate 146. This causes the output of the "nand" gate 146 to go low, thereby enabling "and" gate 148, causing the terminal lead B to go high.

The Q output terminal of the cue mode control flip-flop 144 in the mode control circuit 141 is also connected to the A input terminal of a one-shot 170, whose $\overline{Q}$ output terminal is connected to the B input terminal of flip-flop 138, and the $\overline{Q}$ terminal of flip-flop 138 is, in turn, connected to the A input terminal of flip-flop 136. The Q output terminal of flip-flop 136 is, in turn, connected to an inverter 172 which supplies a reset pulse to the integrated circuits 116, 118 and 119 of the binary counter 114.

Therefore, after a certain delay time following the end of the cue mode, as established by the one-shot 170, and flip-flops 136 and 138, the binary counter 114 is reset. As flip-flop 136 is reset, flip-flop 142 is clocked to its reset position which causes reset enable terminal E of FIG. 5A to go high. This enables "nand" gates 200, 272 and "and" gate 201 of FIG. 5A. Also, flip-flop 140 of FIG. 5A is reset causing terminal A to go low. The tapes in the video tape recorders now stop since the cue position has been reached. The control system is now ready for the preview edit operation.

The $\overline{Q}$ output terminal of one-shot 170 in the mode control circuit 141 (FIG. 5A) is also connected to the B input terminal of a one-shot 180. This causes the one-shot 180 to be reset for a predetermined time, as established by the setting of a potentiometer R39. The $\overline{Q}$ output terminal of one-shot 180 goes low for the predetermined time disabling the "and" gate 184 which, in turn, disables "nand" gates 186 and 188, so that a small delay is incorporated into the system before the preview mode can be initiated, in order to prevent jerking of the tape.

The control circuit of FIG. 5B also includes a flip-flop 160 which controls the driver circuit 44 for the preview lamp in the preview pushbutton switch 30. The Q output terminal 15 of preview flip-flop 160 is connected through an "and" gate 162 to the input terminal of the driver circuit 44. The flasher pulses from the pulse generator 105 are applied to the clock input terminals of the preview flip-flop 160. The "and" gate 162 is enabled at this time due to the fact that the $\overline{Q}$ terminal of flip-flop 142 in the mode control circuit 141 is high. Therefore, the preview lamp in the preview pushbutton switch 30 now flashes, to indicate to the operator that the next mode of operation is the preview mode.

The preview mode is initiated by actuating the preview edit pushbutton switch 30 (FIG. 5B). The switch is connected to a grounded 0.01 microfarad capacitor C3 and to a 1 kilo-ohm resistor R22. The resistor R22 is connected to the positive terminal of the 5-volt direct current source. The pushbutton switch 30 is connected to one terminal of a "nand" gate 200, the output terminal of which is connected to one terminal of "nand" gate 188. The output terminal of "nand" gate 188 is connected to the preset terminal of preview flip-flop 206 to set the flip-flop. The flip-flop 206 is reset at the end of the preview mode by the output of "and" gate 201 connected to its clear terminal.

The $\overline{Q}$ output terminal of the recue flip-flop 206 is connected to an input terminal of an "and" gate 244. The output terminal of "and" gate 244 is connected to the clock input terminal of preview mode control flip-flop 246 to set the flip-flop, so that its Q output terminal goes high. This causes the motor lead B (FIG. 5A) to go low, so that the video tapes in the video tape recorder start to move in their forward direction.

As the video tapes move in the forward direction, the binary counter 114 again begins to count, and when the edit frame is reached, the comparator 120 develops an output which triggers the one-shot 182 which, in turn, triggers a one-shot 230 so that a pulse appears at its $\overline{Q}$ output terminal which is connected to an output terminal 150 (FIG. 5A). The output terminal 150 is connected to a video switch in the record video tape recorder (designated "E-to-E" switch), by way of input terminal B28 of FIG. 6B. This switch serves to shift the monitor 12 (FIG. 3) from the playback video tape recorder 16 to the record video tape recorder 20 precisely at the edit frame. A trim adjustment for the transfer may be made by adjusting the potentiometer 42 in circuit with the second one-shot 182.

The binary counter 14 starts to count at the initiation of the preview mode, and continues to count during the preview mode until a count corresponding to 500 video frames, for example, or 200 frames beyond the edit frame occurs. This is represented by a full count of the binary counter, and this causes a pulse to pass through the inverter 252 to the B input terminal of one-shot 170 in the mode control circuit 141. This pulse triggers the one-shot 170, causing its $\overline{Q}$ output terminal to go high causing the adjacent flip-flop 138 to be reset. When the flip-flop 138 is reset, its $\overline{Q}$ output terminal triggers the flip-flop 142, causing the latter flip-flop to reset, so that the output terminal A goes high causing the direction of the video tapes of the video tape recorders to be reversed, and the system automatically enters its recue mode.

The Q output terminal of the second flip-flop 138 in the mode control circuit 141 goes low setting the flip-flop 136 by way of the A input terminal of the latter flip-flop. The Q output terminal of the flip-flop 136 now goes high setting the flip-flop 142 to cause its Q output terminal to go high. The latter output terminal is connected through driver 254 to the clear terminal of the first recue flip-flop 202 to reset that flip-flop. The Q output terminal 15 of flip-flop 142 in mode control circuit 141 is also connected to the input terminal of an inverter 256. The output terminal of inverter 256 goes low when the flip-flop 142 is set, and the output terminal of the adjacent "nand" gate 186 then goes high. This causes the recue flip-flop 202 to be set, so that its $\overline{Q}$ output terminal goes low.

Therefore, the recue flip-flop 202 is first reset causing the preview mode control flip-flop 246 to be set, and thereby causing the motor control interface terminal B to go high, so that the video tape in the controlled video tape recorder stops. The recue flip-flop 202 is then set causing the $\overline{Q}$ terminal of the flip-flop to go low, so that the preview mode control flip-flop 46 is again triggered to the reset state, so that the output terminal B then goes low. This latter action causes the video tapes in the video tape recorders to move during the recue mode in the reverse direction back through the edit frame to the original cue position.

The flip-flop 246 is subsequently reset by the output of "and" gate 245 connected to its clear input terminal. The output terminal of "and" gate 245 is also connected to "and" gate 201 so that flip-flop 206 may be cleared at the end of the recue mode. The $\overline{Q}$ output terminal of the normal mode flip-flip 110 is connected to one input of "and" gate 245 through a diode CR20, and the full count output of binary counter 114 is connected through an inverter driver 251 to the other input of "and" gate 245.

When the original cue position is reached, the counter 114 develops a full count output pulse through inverter 252 to trigger the flip-flop 170 through capacitor C10 and input terminal B. The flip-flop 170 triggers the adjacent flip-flop 138 which, in turn, triggers the flip-flop 140 causing its $\overline{Q}$ output terminal to go high, so that the output terminal A goes high stopping the video tapes in the video tape recorders. The tapes are not stopped at their original cue position, namely 300 frames in front of the edit frame.

The flip-flop 138 also triggers the flip-flop 136 so that the Q output terminal of the latter flip-flop changes state to reset the counter 114 through the inverter 172.

As mentioned above, the two circuits such as the circuit of FIG. 5 are provided, one for the playback tape recorder, and one for the record video tape recorder. Also, the two circuits are interlocked, so that the control exerted on the tapes in the two recorders are carried out simultaneously.

To this end, the pushbutton control switches are interlocked between the two circuits, as described above. Also, the $\overline{Q}$ output terminal of the one-shot 180 is also connected to an output terminal 31, to a gate 184 in the other circuit, and an input terminal 32 is connected to the one-shot 170 in the other circuit, to provide a preview and recue interlock, so that no mode change can be made in either circuit until the preview circuit has completed its preview mode.

Furthermore, the Q terminal of the normal flip-flop 110 is connected to a flasher disable output terminal 33, to interlock with the other circuit. Likewise, the flasher disable output from the other circuit is applied to an input terminal 37 which is connected to the B input terminals of flip-flops 130 and 132 in the flasher pulse generator to disable the flasher pulse generator at the appropriate time.

At this time, another preview operation may be made by actuating the preview edit switch 30, so that the above-described operations will repeat. However, if desired, an edit may now be made by actuating the perform edit switch 38, together with the preview switch 30.

The perform edit switch 38 is connected to a grounded capacitor C27 of 0.01 microfarads, and to a 1 kil-ohm resistor R85, the resistor being connected to the positive terminal of the 5-volt source. The perform edit switch 38 is also connected to an inverter 270 which, in turn, is connected to the input terminal of a "nand" gate 272. The output terminal of "nand" gate 272 is connected to the preset terminal of edit flip-flop 274. The Q output terminal of edit flip-flop 274 is connected through an "and" gate 276 to a driver circuit 278. The driver circuit 278 is connected to the lamp associated with the stop switch 26, so that the lamp is flashed, by virtue of the flasher pulses applied to the input terminal of the "and" gate 276. Since flasher pulses are applied directly to gate 276 (not divided by 2 with a flip-flop as was the case with "Preview" and "Cue"), the "Perform" lamp flashes at twice the normal rate.

The $\overline{Q}$ output terminal of normal flip-flop 110 is connected to the "A" input of a one-shot 904. The Q output terminal of one-shot 904 is connected to the "A" input of a one-shot 905. The $\overline{Q}$ output of one-shot 905 is connected through diode CR36 to the anode of diode CR23, to the anode of diode CR24 and to the CLR input of the edit flip-flop 274. The one-shots 904, 905 are triggered during the stop mode when the $\overline{Q}$ output of flip-flop goes low. After a particular interval, one-shot 905 produces a delayed pulse which resets the edit flip-flop 274. This guarantees that the edit flip-flop will be reset a predetermined time after a stop command is generated.

The Q output terminal of the edit flip-flop 274 is connected to an "and" gate 280, which is enabled after a predetermined delay by the one-shot 182, so that a record mode initiate pulse is passed through an inverter driver 284 to the input terminal B25 of FIG. 6B, by way of output terminal 190. The $\overline{Q}$ output terminal of the edit flip-flop 274 is also connected to one input terminal of "and" gate 290, the output terminal of which is connected through a driver 292 to the lamp associated with the perform edit switch 38.

As stated, the preview edit switch 30 is depressed at the same time as the perform edit switch 38, so that the tape in the controlled video tape recorder will move in the forward direction and repeat the operation described above. However, in the perform edit mode, when the edit frame is reached, information from the playback recorder is transferred to the record video tape recorder.

The "and" gate 900 (FIG. 5B) is included in the circuit to prevent the tape from moving forward should the preview edit switch be actuated when the system is not conditioned to enter the preview mode. So long as the "and" gate 900 is disabled, preview flip-flop 160 cannot be set by CK. However, when the comparator 120 causes the output of "and" gate 148 (FIG. 5A) to go high will terminal A go high enabling gate 900. Then, when the preview switch 30 is actuated, flip-flop 160 is set and the system will enter the preview mode. Terminal A will only be high when the system is not in some other mode, such as cue, recue, etc.

The interface circuit of FIG. 6A is shown as associated with joystick 22 in the playback video tape recorder. The circuit includes a first comparator 300 and a second comparator 302. A similar circuit is associated with the joystick 32 of the record video tape recorder, except that the latter circuit does not include the comparator 302, or its associated circuit.

The joystick 22 includes a potentiometer 301 which is connected between the positive and negative terminals of a 12-volt source, which source is highly stabilized. The positive 12-volt terminal is connected to a grounded 10 microfarad capacitor C300, and the negative terminal of the source is also connected to a 10 microfarad grounded capacitor C302. The positive and negative terminals of the source are shunted by a 15 kilo-ohm resistor R300, a 50 kilo-ohm potentiometer R302 and a 15 kilo-ohm resistor R304. The wiper of potentiometer R302 is connected through a 4.7 kilo-ohm resistor R306 to the positive input terminal of comparator 302. Comparator 302 may be of the type presently designated LM311. The wiper of potentiometer R302 is also connected to a grounded 10 microfarad capacitor C304 and to a grounded 10 kilo-ohm resistor R308.

The wiper of the joystick potentiometer R304 is connected through a 10 kilo-ohm resistor R310 and through a 15 kilo-ohm resistor R312 to the negative input terminal of comparator 302. The negative input terminal of comparator 302 is also connected to a grounded capacitor C307 of 0.1 micorfarads. The junction of resistors R310 and R312 is connected to a grounded 10 microfarad capacitor C306 and to a grounded 10 kilo-ohm resistor R314. The resistors R310, R312, R314 and the capacitors C306 and C307 from a noise filter.

The potentiometer R302 provides a trip point adjustment for the comparator 302. This trip point is adjusted so that when the joystick 22 is moved from its central position in the forward direction, the output of comparator 302 changes abruptly from a relatively high level to a relatively low level. The output terminal of the comparator is connected through a 2.2 kilo-ohm resistor R316 to the positive terminal of a 5-volt direct current source, and the output terminal is also connected to a grounded 0.1 microfarad capacitor C308.

The 12-volt reference source is also shunted by a 15 kilo-ohm resistor R318, a 50 kilo-ohm potentiometer R320, and a 15 kilo-ohm resistor R322. The wiper of potentiometer R320 is connected through a 4.7 kilo-ohm resistor R324 to the positive input of comparator 300. The wiper is also connected to a grounded 10 kilo-ohm resistor R326 and to a grounded 10 microfarad capacitor C311.

The wiper of the joystick potentiometer R304 is connected through a 10 kilo-ohm resistor R328 and through a 15 kilo-ohm resistor R330 to the negative input of comparator 300. The junction of resistors R328 and R330 is connected to a grounded 10 microfarad capacitor C310, and to a grounded 10 kilo-ohm resistor R332. The negative input terminal of comparator 300 is also connected to a 0.1 microfarad grounded capacitor C312. The resistors R328, R330 and R332, and the capacitors C310 and C312 form a noise filter. The comparators 300 and 302 may be of the type designated LM311.

The output of comparator 300 assumes a relatively low value when the wiper of the joystick potentiometer R304 is moved in the forward direction, and it assumes a relatively high value when the wiper is moved in the reverse direction. The output terminal of the comparator is connected to a grounded 0.1 microfarad capacitor C314, and is connected to a 2.2 kilo-ohm resistor R334 to the positive terminal of a 5-volt direct current source. The output terminal of comparator 300 is also connected through an inverter 306 to one terminal of a "nand" gate 308. The output terminal of "nand" gate 308 is connected through an inerter 310 to the clear input terminal of a flip-flop 312. Flip-flop 312 may be of the type designated 7496.

The $\overline{Q}$ output terminal of flip-flop 312 is connected through a diode CR10 to the base electrode of an NPN transistor Q10, the $\overline{Q}$ output terminal bein further connected to a grounded 10 microfarad capacitor C316. The base electrode of transistor Q10 is connected through a 4.7 kilo-ohm resistor R336 to the positive terminal of the 5-volt direct current source. The transistor Q10 has its emitter connected to the base of a second NPN transistor Q12 and to a grounded 1 kilo-ohm resistor R338. The collectors of the transistors Q10 and Q12 are connected together. The emitter of transistor Q12 is grounded.

The transistors Q10 and Q12 are connected as a Darlington driver amplifier. Transistor Q10 may be of the type designated 2N3565, and transistor Q12 may be of the type designated MJE2801. The collector of transistor Q12 is connected to the cathode of a diode CR12, the anode of which is grounded. The diode may be of the type presently designated IN4004.

The input terminals A15 and A16 are respectively connected to the output terminals A and B of the circuit of FIG. 5. The input terminal A15 is connected to a "nand" gate 314, whereas the input terminal A16 is connected through an inverter 316 to the "nand" gate 314. The output of "nand" gate 314 is low whenever the tape in the controlled video tape recorder is to be driven in reverse. The output terminal of "nand" gate 314 is connected to a second input terminal of "nand" gate 308.

The "nand" gate 308 is also connected to the A input terminal of a one-shot 318. The one-shot may be of the type presently designated 74123. The $\overline{Q}$ output terminal of the one-shot is connected to one input terminal of a "nand" gate 320, the output terminal of which is connected to the preset input terminal of the flip-flop 312.

The output of "nand" gate 308 is also connected through an inverter 322 to a second input terminal of "nand" gate 320. The second input terminal is connected to a grounded 10 microfarad capacitor C318.

In the presence of a reverse command from the control circuit of FIGS. 5A and 5B, the output of "nand" gate 314 goes low. Should the joystick 22 be moved from its central position in the reverse direction, the output of comparator 300 goes high, so that the output of inverter 306 goes low. Therefore, in the presence of the reverse command, the output of "nand" gate 308 goes high, and the output of inverter 322 goes low. The one-shot 318 is triggered causing $\overline{Q}$ to go low, so that a positive pulse appears at the output of "nand" gate 320. The positive pulse sets the flip-flop 312, causing the $\overline{Q}$ output terminal to go low.

Under these conditions, the driver circuit of transistors Q10 and Q12 energizes a solenoid in the controlled video tape recorder which pulls a drive puck from forward to reverse when the relay is energized, so that the supply reel and take-up reel in the video tape recorder are driven in the reverse direction. This action will be described in conjunction with FIG. 9.

On the other hand, should the joystick 22 be moved in the forward direction, the output of comparator 300 is low, and the output of inverter 306 is high. The output of "nand" gate 308 is now low, so that the output of inverter 310 is high, and this output resets the flip-flop 312 when the joystick is moved to the forward direction. The output terminal $\overline{Q}$ of flip-flop 312 now goes high, and the conductivity of the driver circuit of transistors Q10 and Q12 is interrupted to de-energize the solenoid. This causes the drive puck (FIG. 9) to move back to its original position in the controlled video tape recorder, in which the supply reel and the take-up reel are moved in the forward direction.

The output of inverter 308 is also connected to a "nand" gate 326, the output of which is connected through a diode CR14 to the base of an NPN transistor Q14. The base is connected through a 4.7 kilo-ohm resistor R340 to the positive terminal of the 5-volt source. The emitter of transistor Q14 is connected to the base of a transistor Q16, and to a grounded 620 ohm resistor R342. The collector and emitter of transistor Q16 is shunted by a diode CR16. The diode CR16 may be of the type designated IN4004. Transistor Q14 may be of the type designated 2N3053, and transistor Q16 may be of the type designated MJ2801.

The transistors Q14 and Q16 are connected in a driver circuit similar to the circuit of transistors Q10 and Q12, and are interposed between the driver and the solenoid coil of the controlled video tape recorder. When the latter solenoid coil is energized, it pulls the drive puck (FIG. 9) away from the supply reel when the tape is to be driven in the reverse direction. This occurs whenever the joystick 22 is moved in the reverse direction, and in response to a reverse command. The flip-flop 318 provides a 75 millisecond delay in the operation of the forward idler puck, to permit the supply reel drive puck to be pulled out of the way first by the action of the circuit of the transistors Q14 and Q16, effectively to clear the supply reel drive puck from the path of the idler puck, before the idler puck is operated. This latter action will be described in greater detail subsequently herein in conjunction with FIG. 9.

The input terminal B16 is connected to a second input terminal of "nand" gate 326, and through a diode CR16 to the base of transistor Q10. This connection permits operation of the driver circuits Q10, Q12 and Q14, Q16 by the joystick only during the stop mode when the terminal B16 goes high.

The input terminal B23 is connected to one terminal of a "nand" gate 330, the other input terminal of the "nand" gate being connected to the output of "nand" gate 314. The output of "nand" gate 330 is connected through a 1 kilo-ohm resistor R342 to the base of an NPN transistor Q20, the base being connected to a grounded 4.7 kilo-ohm resistor R344. The emitter of transistor Q20 is grounded, and the collector is connected to the wiper of the joystick potentiometer R304. The transistor Q20 may be of the type designated 2N3565. These connections lock out the joystick circuit during the preview mode, as is desired.

The output of "nand"]gate 314 is also connected to the A input terminal of a one-shot 334. This one-shot serves to compensate for the inertia of the video tape recorder. The $\overline{Q}$ output terminal of one-shot 334 is connected through a pair of diodes CR26 and CR28 to the input of a timer circuit 338. The timer circuit 338 may be an integrated circuit of the type presently designated 8240. The output of the timer circuit is coupled through a 0.1 microfarad capacitor C320 to the base of transistor Q20. The input terminal of the timer circuit 338 is also connected back to the B input terminal of one-shot 334. The timer circuit 338 disables control track pulses from the video tape recorder for approximately 0.5 seconds to insure that only valid pulses will be counted by counter 114 of FIG. 5A. One-shot 334 is enabled only by reverse mode after timer 338 times out to allow adjustment for video tape recorder inertias.

The output of comparator 302 is introduced to one input terminal of a "nand" gate 340. The output of "nand" gate 340 is connected to the preset input terminal of a flip-flop 342, and through an invertor 344 to the clear input terminal of the flip-flop. The input terminals of the invertor 344 are connected to a grounded 10 microfarad capacitor C330. The output of inverter 306 is connected to the other input terminal of "nand" gate 340.

The $\overline{Q}$ output terminal of flip-flop 342 is connected through a 1 kilo-ohm resistor R350 to the base of an NPN transistor Q30. The base of transistor Q30 is connected to a 4.7 kilo-ohm grounded resistor R352, and the emitter is grounded. The transistor Q20 may be of the type presently designated 2N3565. The collector of transistor Q30 is connected through a 4.7 kilo-ohm resistor R354 to the positive terminal of the 5-volt direct current source, and through a diode CR30 to an output terminal 344 which connects with the E-E switch in the record video tape recorder.

The circuit of the transistor Q30 serves as a driver stage. Whenever the joystick 22 is in its central position, the output of comaprator 302 is high, as is the output of inverter 306. Therefore, the "nand" gate 340 is enabled, and its output goes low, so that the output of inverter 344 goes high. The latter output clears the flip-flop 342, and causes the $\overline{Q}$ output to go high, causing the driver circuit of transistor Q30 to operate the E-E switch, so that the monitor 12 of FIGS. 1 and 3 monitors the video tape in the record video tape recorder.

However, the moment the joystick 22 is moved forward away from its central position, the output of comparator 302 goes low, so that the output of "nand" gate 340 goes high to set the flip-flop 342, causing the $\overline{Q}$ output to go low. This action renders the transistor Q30 non-conductive, so that the E-E switch in the record video tape recorder switches the monitor 12 to monitor the video tape in the playback video tape recorder 16.

The interface circuit for the joystick 32 associated with the record video tape recorder 20 is shown in the diagram of FIG. 6B. The circuit of FIG. 6B is generally similar to the circuit of FIG. 6A, and like components have been designated by the same numbers. It will be observed, however, that the circuit of FIG. 6B does not include the comparator 302, the flip-flop 342, the driver Q30 and associated logic components and circuitry.

The circuit of FIG. 6B, however, includes additional circuitry connected to input terminals B28 and B25. Input terminal B28 is connected through a 1 kilo-ohm resistor R400 to the base of PNP transistor Q50, the emitter of which is grounded, and the collector of which is connected through a 4.7 kilo-ohm resistor R402 to the positive terminal of the 5-volt source. The base is further connected to a grounded 4.7 kilo-ohm resistor R403, and the collector is further connected through a diode CR50, and through switch 43, to an output terminal 400. The output terminal 400 is connected to the E-E switch of the record video tape recorder.

The input terminal B28 receives a pulse whenever a digital comparator match is achieved in the comparator 120 of the circuit of FIG. 5A to assure that the E-E switch will be operated whenever the edit frame is reached during the forward motion of the video tape recorder. This is essential, to assure that the monitor 12 of FIGS. 1 and 3 will be switched from the playback video tape recorder 16 to the record video tape recorder 20 when the edit frame is reached during forward motion of the tapes.

The input terminal 25 is connected to an inverter 402 which, in turn, is coupled through a 3.3 microfarad capacitor C400 to the base of an NPN transistor Q52. The emitter of transistor Q52 is grounded, and the base is connected to a 4.7 kilo-ohm grounded resistor R406. The collector is connected through a resistor R408 of 4.7 kilo-ohms to the positive terminal of the 5-volt direct current source. The collector is also connected through a diode CR52 to the output terminal 40, and to a 4.7 kilo-ohm resistor R410, which connects with the positive terminal of the 5-volt source. The collector is also connected through a diode CR54 to an output terminal 408, and through a 4.7 kilo-ohm resistor R4112 to the positive terminal of the 5-volt direct current source.

During the edit mode of operation, the input terminal 25 receives an edit command at the moment the edit frame is reached. This edit command not only switches the E-E switch of the record video tape recorder to assure that the monitor 12 will be switched from the playback video tape recorder to the record video tape recorder, but also to cause the record video tape recorder to start recording the moment the edit frame is reached.

As described above in the description of FIG. 5A, the drivers 282 and 285 are coupled through a pair of diodes CR31 and CR37 to the energizing coil of relay R1. When the relay R1 is deenergized, the capstan drive motor of the video tape recorder is connected to the normal video tape recorder motor drive amplifer 171 (FIG. 5A), so that during all modes except the stop and reverse mode, the capstan in the video tape recorder is driven by the motor drive amplifier 171 of the video tape recorder. However, during the stop mode, the relay R1 is energized, so that the motor drive amplifier 173 (FIG. 5A) is connected to the capstan motor of the controlled video tape recorder, the latter motor drive amplifier being controlled by the joysticks 22 or 32, as described in conjunction with FIG. 6A and 6B.

Figure 7:
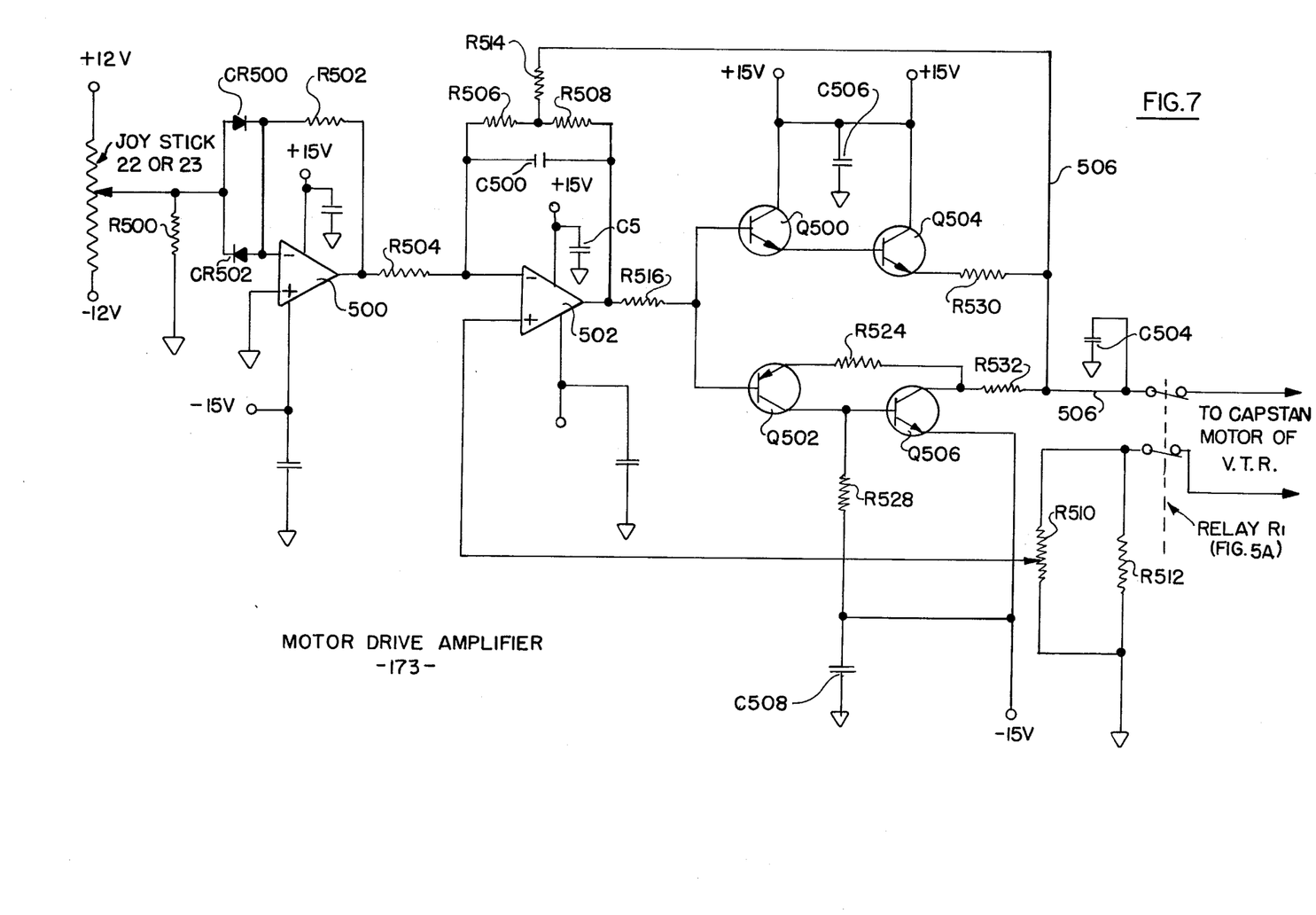
FIG. 7 is a schematic diagram of a motor drive amplifier circuit which, likewise, may be incorporated into the unit of FIG. 1.

The circuit details of the motor drive amplifier 173 are shown in FIG. 7. The particular circuit of FIG. 7 is a direct current coupled completely linear amplifier with a gain of 10:1. As shown in FIG. 7, the wiper of the joystick 22 or 32 is connected through a pair of diodes CR500 and CR502 to the negative input terminal of an amplifier 500. The wiper is also connected to a 330 ohm grounded resistor R500. The amplifier 500 is, in turn, connected to the negative input terminal of a second amplifier 502. The amplifiers 500 and 502 may each be formed of an integrated circuit, of the type presently designated 741.

The positive input terminal of the amplifier 500 is grounded, and a 47 kilo-ohm resistor R502 is connected between the output terminal and the negative input terminal. The circuitry associated with the negative terminal of amplifier 500 constitutes a logarithmic circuit. The logarithmic circuit controls the relationship between the input amplitude and the deflection of the joystick so that small changes in input amplitude occur around the central position of the joystick, but increasingly greater changes in input amplitude occur as the joystick deflection is increased. This provides for a relatively slow speed of the controlled capstan motor in the vicinity of the central position of the joystick, with increasing speeds as the joystick is moved away from the central position The output terminal of the amplifier 500 is connected through a 4.7 kilo-ohm resistor R504 to the negative input terminal of the amplifier 502. The negative input terminal of the latter amplifier is connected to the output terminal through a pair of 10 kilo-ohm resistors R506 and R508. These resistors are shunted by a 0.001 microfarad capacitor C500. The positive input terminal of amplifier 502 is connected to the wiper of a 500 ohm potentiometer R510, which is shunted by a 1 ohm resistor R512. The potentiometer R510 and resistor R512 are connected to ground and to the normally closed contacts of the relay R1 of FIG. 5A. The potentiometer R510 is a damping adjustment. The potentiometer applies opposite polarity voltage to the drive motor of the video tape recorder at every mode change for a quick stop of the capstan. The common junction of resistors R506 and R508 are connected through a resistor R514 to the other pair of normally closed relay contacts by way of a lead 506. The lead 506 is connected to a grounded 0.1 microfarad capacitor C504.

The output terminal of amplifier 502 is connected through a 22 ohm resistor R516 to the bases of a pair of transistors Q500 and Q502. The collector of transistor Q500 is connected to a grounded 0.1 microfarad capacitor C506, and the collector of transistor Q502 is connected through a 220 ohm resistor R528 to the negative terminal of the 15-volt source and to a grounded 0.1 micro-farad capacitor C508. The transistor Q500 is an NPN transistor and may be of the type designated 2801, and the transistor Q502 is a PNP transistor and may be of the type designated 2901.

The emitter of the transistor Q500 is connected to the base of a further transistor Q5034 which likewise is an NPN transistor, and may be of the type designated TIP3055. The collector of PNP transistor Q502 is connected to the base of an NPN transistor Q506. The transistor Q506 may also be of the type designated TIP3055. The collector of transistor Q506 is connected back through a resistor R524 to the emitter of transistor Q502. The emitter of transistor Q506 is connected to the negative terminal of the 15-volt direct voltage source. The emitter of transistor Q504 is connected through a 0.68 ohm resistor R530 to the lead 506, and the collector of transistor Q506 is connected through a 0.68 ohm resistor R532 to lead 506.

When the joystick is in its central position, the output from the amplifier circuit of FIG. 7 is zero. When the joystick is moved in one direction the output of the amplifier increases with a first polarity to turn the capstan motor in the forward direction. When the joystick is moved in the opposite direction, the output of the amplifier increases with reverse polarity to turn the capstan motor in the reverse direction.

As mentioned above, two such amplifiers are provided, one for each joystick control system. The motor drive amplifier 173 of FIG. 7 is effective to control the capstan motor of the corresponding video tape recorder only when the relay R1 of FIG. 5A is energized to remove the capstan drive motor from the control of the motor drive amplifier in the video tape recorder and to place it under the control of the motor drive amplifier of FIG. 7.

Figures 8, 9:
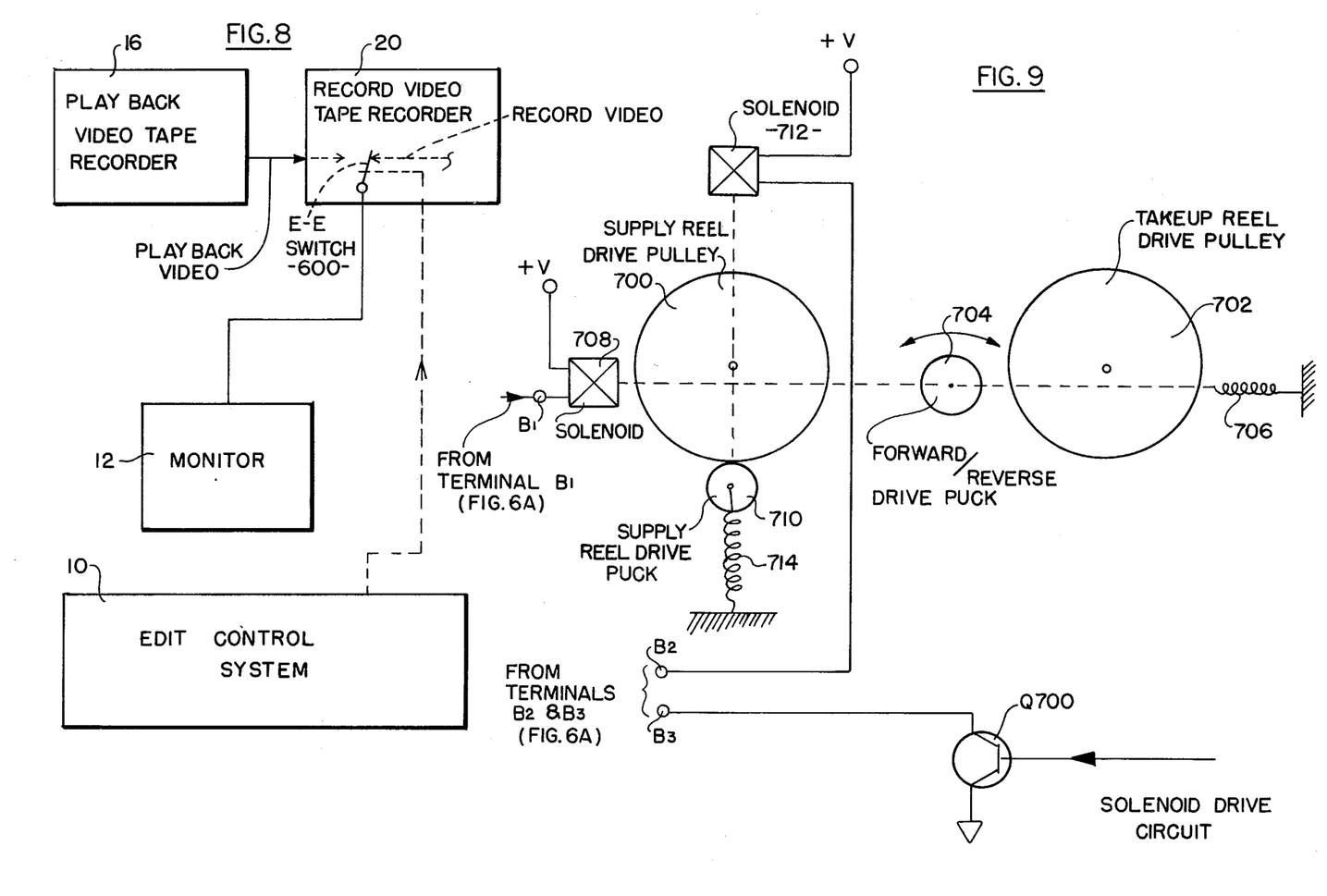
FIG. 8 is a block diagram of the monitor and edit control system of the invention and of how these elements are connected to the record and playback video tape recorders.
FIG. 9 is a schematic diagram of various controls in the video tape recorders.

FIG. 8 is a block diagram of the playback video tape recorder 16 and the record video tape recorder 20, and showing the E-E switch 600 which is included in the record video tape recorder. The monitor 12 is connected to the movable contacts of the E-E switch 600, and the switch is controlled by the edit control system 10, in the manner described above. When the switch is placed to the left in FIG. 8, the monitor 12 monitors the video information from the playback video tape recorder 16, and when the switch is placed to the right, the monitor monitors the video information from the record video tape recorder 20.

FIG. 9 is a schematic representation of the drive controls associated with the supply reel and take-up reel in the record and playback video tape recorders. A first drive pulley 700 drives the supply reel, and a second drive pulley 702 drives the take-up reel. A drive puck 704 is rotatably driven by an appropriate motor, and it is normally spring-biased against the drive pulley 702 by a spring 706, to drive the drive pulley 702, for example, in the forward direction. A solenoid 708 is coupled to the puck 704, and when that solenoid is energized, for example, from the terminal B1 of FIG. 6A, the puck 704 is drawn againt the supply reel drive pulley 700 to drive the pulley 700 in the reverse direction.

A second drive puck 710 is also provided, and it also is driven by an appropriate motor. The drive puck 710 is drawn against the supply reel drive pulley 700 by a solenoid 712, and it serves to drive the supply reel pulley 700 is the reverse direction during forward motion of the tape, to maintain a degree of tension on the tape, as it is drawn across the transducer heads, When the circuit to the solenoid 712 is interrupted, a spring 714 draws the supply reel drive puck away from the periphery of the drive pulley 700.

A drive circuit, including a transistor Q700 is included in the video tape recorder, and the collector of the transistor Q700 is connected to the solenoid 712, so that under normal conditions the solenoid is energized whenever the drive circuit is activated. However, the connection is interrupted by the terminals B2 and B3 of FIG. 6A, so that the edit control system 10 may interrupt the drive to the solenoid 712 under the conditions described above, so as to permit a reverse motion of the tape. It will be understood that a control assembly such as shown in FIG. 9 is included in each of the video tape recorders.

The invention provides, therefore, an improved editing control system for transferring selected video information either directly from a video camera, or from a playback video tape recorder to a record video tape recorder, such that selected editing may be carried out, so that selected video information only is transferred to the record video tape recorder.

It will be appreciated that although a particular embodiment of the invention has been shown and described, modifications may be made. It is intended in the claims to cover the modifications which come within the true spirit and scope of the invention.

What is claimed is:

1. An edit control system for transferring selected video information from a video source to a record video tape recorder, said record video tape recorder including a supply reel, a take-up reel, drive means for causing video tape to be transported between the supply reel and the take-up reel in either direction, first means for supplying drive signals to said drive means, said edit control system including: second means for supplyng drive signals to said drive means in the video tape recorder; circuit means for selectively connecting said first and second drive signal supplying means to said drive means in the video tape recorder; first manually controlled switching means connected to said drive means in the video tape recorder and to said circuit means for stopping the video tape and for causing said first drive signal supplying means in the video tape recorder to be disconnected from the drive means in the video tape recorder and for causing said second drive signal supplying means to be connected to the drive means in the video tape recorder; and control circuit means including manually-controllable potentiometer means connected to said second drive signal supplying means for causing the drive means in the video tape recorder to drive the video tape in the video tape recorder under manual control in either direction from a still-frame position at a rate determined by the setting of the potentiometer means.

2. The edit control system defined in claim 1, in which the manually-controllable potentiometer means includes a pivotally mounted joystick control member.

3. The edit control system defined in claim 1, in which the source of video information is directly connected to the record video tape recorder to supply the video information directly to the record video tape recorder along a path independent of the edit control system.

4. The edit control system defined in claim 1, and in which includes a monitor for visually displaying video information, and a switch included in the record video tape recorder for selectively introducing video information from the source and from the record video tape recorder to the monitor, and further control circuit means included in the edit control system for operating the switch.

5. The edit control system defined in claim 4, in which said source comprises a playback video tape recorder, and said edit control system includes a manually-operable potentiometer means for controlling the direction and speed of the video tape in the playback video tape recorder; and in which said further control circuit means operates said switch whenever the last-named potentiometer means is moved to or from its central position.

6. The edit control system defined in claim 5, in which said last-named manually-controllable potentiometer means includes a pivotally mounted joystick control member.

7. The edit control system defined in claim 1, in which the edit control system includes a manually controlled switching circuit means connected to one of said first and second drive signal supplying means for causing the video tape in the record video tape recorder to move in a forward direction from the supply reel to the take-up reel.

8. The edit control system defined in claim 7, in which said edit control system includes a second manually controlled circuit means connected to one of said first and second drive signal supplying means for causing the video tape in the record video tape recorder to move in the reverse direction from a selected edit frame through a preselected number of frames to a cue frame position, and then to cause the video tape to move forwardly through the selected edit frame.

9. The edit control system defined in claim 8, and which includes a monitor for visually displaying the video information from the source and from the record video tape recorder, and a further control circuit included in the edit control system for causing video information from the video source to be introduced to the monitor until the edit frame is reached, and then for causing video information from the record video tape recorder to be introduced to the monitor.

10. The edit control system defined in claim 8, and which includes a fourth manually controlled switching circuit means connected to one of said first and second drive signal supplying means to permit the video tape in the record video tape recorder to move through the edit frame position and through a pre-selected number of frames to a predetermined re-cue frame position without the transfer of informtion from the video source to the recorder video tape recorder for preview purposes.

11. The edit control system defined in claim 8, in which the edit control system includes a third manually controlled switching circuit means for causing the video information from the source to be transferred to the record video recorder when the selected edit frame is reached.

12. The edit control system defined in claim 11, and which includes a manually operated switch connected to said third manually controlled switching circuit means, said last-named switch being settable to a position to provide a delay in the transfer of the video information from the video source to the record video tape recorder to compensate for audio delays in the system.

* * * * *